United States Patent
Harrington et al.

(10) Patent No.: US 9,238,588 B2
(45) Date of Patent: Jan. 19, 2016

(54) ORGANIC DISULFIDE BASED CORROSION INHIBITORS

(71) Applicant: ECOLAB USA INC., Naperville, IL (US)

(72) Inventors: Ryan Harrington, Houston, TX (US); Keith Monk, League City, TX (US); Boyd Laurent, Sugar Land, TX (US); Jeremy Moloney, Katy, TX (US)

(73) Assignee: Ecolab USA, Inc., Naperville, IL (US)

(*) Notice: Subject to any disclaimer, the term of this patent is extended or adjusted under 35 U.S.C. 154(b) by 229 days.

(21) Appl. No.: 13/958,365

(22) Filed: Aug. 2, 2013

(65) Prior Publication Data

US 2015/0037202 A1 Feb. 5, 2015

(51) Int. Cl.
| | |
|---|---|
| *C23F 11/00* | (2006.01) |
| *C23F 11/04* | (2006.01) |
| *B08B 9/00* | (2006.01) |
| *C02F 5/02* | (2006.01) |
| *C09K 3/00* | (2006.01) |
| *C02F 5/10* | (2006.01) |
| *C09K 8/54* | (2006.01) |
| *C23F 11/10* | (2006.01) |
| *C23F 11/16* | (2006.01) |
| *C02F 1/56* | (2006.01) |

(52) U.S. Cl.
CPC ... *C02F 5/10* (2013.01); *C02F 1/56* (2013.01); *C09K 8/54* (2013.01); *C23F 11/10* (2013.01); *C23F 11/16* (2013.01); *C02F 2303/08* (2013.01)

(58) Field of Classification Search
CPC .......... C25F 11/00; C23C 30/00; C23F 15/00
USPC .......... 422/7, 12; 134/22.19, 28; 252/175, 387
See application file for complete search history.

(56) References Cited

U.S. PATENT DOCUMENTS

| | | | |
|---|---|---|---|
| 4,295,979 A | 10/1981 | Sharp et al. | |
| 4,350,600 A | 9/1982 | Sharp et al. | |
| 4,382,002 A | 5/1983 | Walker et al. | |
| 4,450,102 A * | 5/1984 | Lindstrom et al. | 510/254 |
| H001147 H | 3/1993 | Kennelley et al. | |
| 6,620,338 B2 | 9/2003 | Fan et al. | |
| 6,645,399 B2 | 11/2003 | Ahn et al. | |
| 7,972,655 B2 | 7/2011 | Abys et al. | |
| 2004/0170848 A1 | 9/2004 | Ludwig et al. | |
| 2005/0079095 A1 | 4/2005 | Crovetto et al. | |
| 2005/0183793 A1 | 8/2005 | Kim et al. | |
| 2010/0175583 A1 | 7/2010 | Roschmann et al. | |
| 2010/0197136 A1 | 8/2010 | Shimada et al. | |

FOREIGN PATENT DOCUMENTS

| | | |
|---|---|---|
| DE | 3008500 | 9/1980 |
| WO | 00/75399 A2 | 12/2000 |

OTHER PUBLICATIONS

International Search Report and Written Opinion issued for PCT/US2014/048567 dated Jan. 28, 2015, 14 pages.

* cited by examiner

*Primary Examiner* — Monzer R Chorbaji
(74) *Attorney, Agent, or Firm* — Senniger Powers LLP

(57) ABSTRACT

Disclosed are corrosion inhibitor compounds and compositions useful in applications relating to the production, transportation, storage, and separation of crude oil and natural gas. Also disclosed are methods of using the compounds and compositions as corrosion inhibitors, particularly in applications relating to the production, transportation, storage, and separation of crude oil and natural gas.

20 Claims, No Drawings

ORGANIC DISULFIDE BASED CORROSION INHIBITORS

TECHNICAL FIELD

The present disclosure relates generally to corrosion inhibitors, and more particularly corrosion inhibitors including an organic disulfide.

BACKGROUND

One of the greatest risks to oil and gas production infrastructure is accelerated internal pipeline corrosion, particularly as a field ages and water cut rises. The production of oil and gas reservoirs present corrosive environments that place the internal metallurgy of process equipment (e.g., transport pipelines, flow lines, separation equipment), often constructed of mild carbon steel, at risk for failure. The rate of corrosion deterioration in oil and gas field equipment metallurgy is dependent upon production parameters such as oil/water ratio, fluid brine composition, temperature, pH, and the concentration of corrosive gases typically present in the reservoir formation, such as $CO_2$, $H_2S$, or combinations thereof.

In order to preserve the integrity of oil and gas infrastructure, corrosion inhibitors are typically added into the production fluids upstream of piping infrastructure intended to be protected. In general, corrosion inhibitors of this type protect the metal through formation of a passivation film on the metal surface. This passivation layer oil wets the metal surface, which in turn prevents contact of the metal from the corrosive nature of the produced reservoir fluids. Typically, corrosion inhibitor formulations of this type contain a variety of aliphatic organic surfactant molecules ranging from, but not limited to, amines, quaternary amines, imidazolines, phosphate esters, amides, carboxylic acids, or combinations thereof.

Often, organic thiol compounds are added in low concentrations to these corrosion inhibitor components to increase the effectiveness of the traditional corrosion inhibitor molecules. It is believed that these organic thiol molecules create a stronger passivation layer on the metal surface which also increases the persistency of the protective film. In most examples, the sulfur based component consists of a primary thio/mercaptan (e.g., 2-mercaptoethanol or mercaptoacetic acid). In some instances, however, such thiol based formulations may degrade at elevated temperatures (e.g., during storage at elevated temperatures) to release volatile sulfur-containing vapor/gases (e.g., mercaptans, sulfur dioxide, hydrogen sulfide, and/or carbonyl sulfide).

Despite the availability of corrosion inhibitors for use in the oil and gas industry, there still exists a need for improved compounds, compositions, and methods.

SUMMARY

In one aspect, disclosed is a method of inhibiting corrosion at a surface, the method comprising contacting the surface with a composition comprising a compound of formula (I),

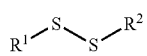

(I)

wherein,
$R^1$ and $R^2$ are each independently selected from the group consisting of alkyl, alkenyl, alkynyl, aryl, heteroaryl, heterocycle, and cycloalkyl, wherein said alkyl, alkenyl, alkynyl, aryl, heteroaryl, heterocycle, and cycloalkyl are each independently substituted or unsubstituted with one or more suitable substituents.

In certain embodiments, the following compounds and their acid addition salts are excluded: cystine; cystamine; disulfides of 1-amino-2-methyl-2-thiopropane, 1-amino-3-thiopropane, 1-amino-4-thiobutane, 2-amino-3-methyl-1-thiobutane, 2-amino-1-thiohexane, 2-amino-3,3-dimethyl-1-thiobutane, 1-amino-2-thiopropane, 2-amino-3-methyl-3-thiobutanecarboxylic acid (penicillamine), 2-amino-3-thiobutanecarboxylic acid (homocysteine), 2-amino-2-methyl-1-thiopropane, 1-amino-2-thiohexane, 2-amino-1-thiohexadecane, 2-amino-3-thioadipic acid, 2-amino-3-thio-3-phenylpropanecarboxylic acid, 1-amino-2-thio-1,2-diphenylethane, and 2-(2-amino-1-thioethyl)-naphthalene; diethyl disulfide; di-n-propyl disulfide; diisopropyl disulfide; di-n-butyl disulfide; di-sec-butyl disulfide; diisobutyl disulfide; di-tert-butyl disulfide; di-n-pentyl disulfide; di-neopentyl disulfide; di-n-hexyl disulfide; di-n-heptyl disulfide; di-n-octyl disulfide; di-n-nonyl disulfide; di-n-decyl disulfide; di-n-dodecyl disulfide; di-n-tridecyl disulfide; di-n-tetradecyl disulfide; di-n-pentadecyl disulfide; di-n-hexadecyl disulfide; di-n-heptadecyl disulfide; di-n-octadecyl disulfide; di-n-decyl disulfide; diundecyl disulfide; didodecyl disulfide; dihexadecyl disulfide; diallyl disulfide; dibenzyl disulfide; 2-naphthyl disulfide; and dithienyl disulfide.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently unsubstituted or substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_1$-$C_{10}$-alkyl, each optionally substituted with 1 to 3 substituents independently selected from the group consisting of —OH and —$CO_2H$.

In certain embodiments, $R^1$ and $R^2$ are each selected from $C_1$-$C_{10}$-alkyl, each substituted with 1 to 3 substituents independently selected from the group consisting of —OH and —$CO_2H$.

In certain embodiments, $R^1$ and $R^2$ are each selected from linear $C_1$-$C_{10}$-alkyl, each substituted with a terminal —OH group.

In certain embodiments, $R^1$ and $R^2$ are each selected from linear $C_1$-$C_{10}$-alkyl, each substituted with a terminal —$CO_2H$ group.

In certain embodiments, $R^1$ and $R^2$ are each selected from $C_6$-$C_{12}$-aryl, each optionally substituted with 1 to 3 substituents independently selected from the group consisting of —OH and —$NH_2$.

In certain embodiments, $R^1$ and $R^2$ are each selected from phenyl, each optionally substituted with 1 to 3 substituents independently selected from the group consisting of —OH and —$NH_2$.

In certain embodiments, $R^1$ and $R^2$ are each selected from phenyl, each substituted with an —$NH_2$ group.

In certain embodiments, $R^1$ and $R^2$ are each selected from phenyl, each substituted with an —OH group.

In certain embodiments, $R^1$ and $R^2$ are each selected from a 5- or 6-membered monocyclic heteroaryl, each optionally substituted with 1 to 3 suitable substituents.

In certain embodiments, the composition comprises one or more compounds of formula (I), each independently selected from the group consisting of: 2,2'-dithiodiethanol; 2,2'-dithiodiacetic acid; 3,3'-Dithiodipropionic acid; 4,4'-dithiodibutyric acid; 3,3'-dihydroxydiphenyl disulfide; 4-aminophenyl disulfide; 2-aminophenyl disulfide; and 2,2'-dithiodipyridine.

In certain embodiments, the composition further comprises one or more additional components, each component independently selected from the group consisting of additional corrosion inhibitors, solvents, asphaltene inhibitors, paraffin inhibitors, scale inhibitors, emulsifiers, water clarifiers, dispersants, emulsion breakers, gas hydrate inhibitors, biocides, pH modifiers, and surfactants.

In certain embodiments, the composition provides at least 80% corrosion protection for a 1018 carbon steel coupon in a wheel box test, wherein the wheel box test is characterized by: (a) a testing temperature of about 176° F.; (b) a $CO_2$ saturated liquid medium of 10% LVT-200 oil and 90% ASTM Seawater brine; (c) a test duration of 24 hours; and (d) an inhibitor dosage of 20 ppm based on total fluids.

In certain embodiments, the composition provides at least 94% corrosion protection for a 1018 carbon steel coupon in a wheel box test, wherein the wheel box test is characterized by: (a) a testing temperature of about 176° F.; (b) a $CO_2$ saturated liquid medium of 10% LVT-200 oil and 90% ASTM Seawater brine; (c) a test duration of 24 hours; and (d) an inhibitor dosage of 2.5 ppm based on total fluids.

In certain embodiments, the composition provides 200 ppm or less, 150 ppm or less, 100 ppm or less, 50 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4 ppm or less, 3 ppm or less, 2 ppm or less, 1 ppm or less, or 0 ppm of sulfur species into a headspace. The headspace test can include: (a) placing a sample of the composition into a sealed receptacle; (b) aging the composition of (a) at a selected temperature for a selected time period; and (c) sampling the headspace for sulfur species. In certain embodiments, the headspace test can include: (a) placing 40 g of the composition into an 8 oz glass jar sealed with a cap containing a hole fitted with a rubber stopper which is used for sampling; (b) aging the composition of (a) in a 50° C. oven over a period of 10 days before sampling; and (c) sampling the headspace using sulfur detection tubes. The sulfur species quantified may include hydrogen sulfide, mercaptans (e.g., methyl mercaptan, ethyl mercaptan, and the like), sulfur dioxide, and/or carbonyl sulfide. In certain embodiments, the composition comprises about 2.5% wt. of one or more compounds of formula (I) in a 1:1 water:glycol ether solvent system. In certain embodiments, the composition comprises about 2.5% wt. of one or more compounds of formula (I) and about 7.5% wt. of a quaternary amine salt corrosion inhibitor in a 1:1 water:glycol ether solvent system.

In certain embodiments, the surface is part of equipment used in the production, transportation, storage, and/or separation of crude oil or natural gas.

In certain embodiments, the surface is part of equipment used in a coal-fired process, a waste-water process, a farm, a slaughter house, a land-fill, a municipality waste-water plant, a coking coal process, or a biofuel process.

The compounds, compositions, methods and processes are further described herein.

DETAILED DESCRIPTION

Disclosed herein are corrosion inhibitor compounds and compositions, methods of using said compounds and compositions, and processes for their preparation. The compounds and compositions are particularly useful for inhibiting corrosion in equipment used in the production, transportation, storage, and separation of crude oil and natural gas. The compounds and compositions include a class of organic disulfide based corrosion inhibitors that are stable at elevated temperatures when contained in a blended corrosion inhibitor formulation, and show reduced or no volatile degradation species in the vapor phase, unlike that of alkylthiol based counterparts. As an added benefit, the disclosed organic disulfides do not exhibit the harsh, offensive thiol/mercaptan based odor typically associated with thiol containing corrosion inhibitors.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl— and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups may be unsubstituted or substituted by one or more suitable substituents, as defined above.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents, as defined above.

The term "alkynyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups may be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "arylalkyl," as used herein, refers to an aryl group attached to the parent molecular moiety through an alkyl group. Arylalkyl groups may be unsubstituted or substituted by one or more suitable substituents, as defined above.

The term "alkylarylalkyl," as used herein, refers to an alkylaryl group attached to the parent molecular moiety through an alkyl group. Alkylarylalkyl groups may be unsubstituted or substituted by one or more suitable substituents, as defined above.

The term "carbonyl," "(C=O)," or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "cycloalkylalkyl," as used herein, refers to a cycloalkyl group attached to the parent molecular moiety through an alkyl group. Cycloalkylalkyl groups may be unsubstituted or substituted by one or more suitable substituents, as defined above.

The term "alkylcycloalkylalkyl," as used herein, refers to a cycloalkylalkyl group substituted by one or more alkyl groups. Alkylcycloalkylalkyl groups may be unsubstituted or substituted by one or more suitable substituents, as defined above.

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined above.

The term "heteroarylalkyl," as used herein, refers to a heteroaryl group attached to the parent molecular moiety through an alkyl group. Heteroarylalkyl groups may be unsubstituted or substituted by one or more suitable substituents, as defined above.

The term "alkylheteroarylalkyl," as used herein, refers to a heteroarylalkyl group substituted by one or more alkyl groups. Alkylheteroarylalkyl groups may be unsubstituted or substituted by one or more suitable substituents, as defined above.

The term "heterocycle" or "heterocyclyl," as used herein, refers to a monocyclic, bicyclic, or tricyclic group containing 1 to 4 heteroatoms selected from N, O, S(O)$_n$, P(O)$_n$, PR$^z$, NH or NR$^z$, wherein R$^z$ is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined above.

The term "heterocyclylalkyl," as used herein, refers to a heterocycle group attached to the parent molecular moiety through an alkyl group. Heterocyclylalkyl groups may be unsubstituted or substituted by one or more suitable substituents, as defined above.

The term "alkylheterocyclylalkyl," as used herein refers to a heterocyclylalkyl group substituted by one or more alkyl groups. Alkylheterocyclylalkyl groups may be unsubstituted or substituted by one or more suitable substituents, as defined above.

The term "hydroxy," as used herein, refers to an —OH group.

The term "oxo," as used herein, refers to a double bonded oxygen (=O) radical wherein the bond partner is a carbon atom. Such a radical can also be thought as a carbonyl group.

The term "sweetening," as used herein, may refer to a process that removes sulfur species from a gas or liquid. The sulfur species may include hydrogen sulfide and mercaptans.

The term "sour gas," as used herein, may refer to a gas that includes significant amounts of sulfur species, such as hydrogen sulfide and/or mercaptans.

The term "sour liquid" or "sour fluid," as used herein, may refer to a liquid that includes significant amounts of sulfur species, such as hydrogen sulfide and/or mercaptans.

The term "water cut," as used herein, means the percentage of water in a composition containing an oil and water mixture.

2. COMPOUNDS

Compounds of the invention include organic disulfides. The compounds may be particularly useful for preventing and/or reducing corrosion of equipment used in the oil, gas, and/or coal industries.

In one aspect, compounds of the invention have formula (I),

wherein, $R^1$ and $R^2$ are each independently selected from the group consisting of alkyl, alkenyl, alkynyl, aryl, heteroaryl, heterocycle, and cycloalkyl, wherein said alkyl, alkenyl, alkynyl, aryl, heteroaryl, heterocycle, and cycloalkyl are each independently substituted or unsubstituted with one or more suitable substituents.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently substituted or unsubstituted with one or more suitable substituents.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently unsubstituted or substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently unsubstituted or substituted with 1 to 3 substituents independently selected from the group consisting of —F, —Cl, —$NO_2$, —CN, —OH, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently substituted with 1 to 3 substituents independently selected from the group consisting of —F, —Cl, —$NO_2$, —CN, —OH, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently substituted with 1 substituent independently selected from the group consisting of —F, —Cl, —$NO_2$, —CN, —OH, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each independently selected from the group consisting of $C_1$-$C_{10}$-alkyl, $C_2$-$C_{10}$-alkenyl, $C_2$-$C_{10}$-alkynyl, $C_6$-$C_{12}$-aryl, monocyclic or bicyclic heteroaryl, monocyclic or bicyclic heterocycle, and $C_3$-$C_8$-cycloalkyl, wherein said alkyl, alkenyl, alkynyl, aryl, heteroaryl, heterocycle, and cycloalkyl are each independently substituted with 1 substituent independently selected from the group consisting of —OH and —$CO_2R^3$, wherein $R^3$ is independently selected from the group consisting of hydrogen and $C_1$-$C_6$ alkyl.

In certain embodiments, $R^1$ and $R^2$ are each selected from $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each optionally substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each substituted with 1 to 3 substituents independently selected from the group consisting of —F, —Cl, —$NO_2$, —CN, —OH, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each substituted with 1 substituent independently selected from the group consisting of —F, —Cl, —$NO_2$, —CN, —OH, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each substituted with 1 substituent independently selected from the group consisting of —OH and —$CO_2R^3$, wherein $R^3$ is independently selected from the group consisting of hydrogen and $C_1$-$C_6$ alkyl.

In certain embodiments, $R^1$ and $R^2$ are each selected from $C_2$-$C_{10}$-alkenyl (e.g., ethenyl, 1-propenyl, 2-propenyl (allyl), iso-propenyl, 2-methyl-1-propenyl, 1-butenyl, or 2-butenyl), each optionally substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl. In certain embodiments, $R^1$ and $R^2$ are not simultaneously unsubstituted allyl.

In certain embodiments, $R^1$ and $R^2$ are each selected from $C_2$-$C_{10}$-alkynyl (e.g., ethynyl, propynyl, or butynyl), each optionally substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_6$-$C_{12}$-aryl (e.g., phenyl, dihydroindenyl, indenyl, naphthyl, dihydronaphthalenyl, or 5,6,7,8-tetrahydronaphthalenyl), each optionally substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_6$-$C_{12}$-aryl (e.g., phenyl, dihydroindenyl, indenyl, naphthyl, dihydronaphthalenyl, or 5,6,7,8-tetrahydronaphthalenyl), each substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_6$-$C_{12}$-aryl (e.g., phenyl, dihydroindenyl, indenyl, naphthyl, dihydronaphthalenyl, or 5,6,7,8-tetrahydronaphthalenyl), each substituted with 1 substituent independently selected from the group consisting of —$NH_2$.

In certain embodiments, $R^1$ and $R^2$ are each selected from 5- to 10-membered heteroaryl (e.g., furanyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, triazinyl, benzofuranyl, benzothienyl, 1,3-benzoxazolyl, benzimidazolyl, indazolyl, indolyl, isoindolyl, isoquinolinyl, naphthyridinyl, pyridoimidazolyl, or quinolinyl), each optionally substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl. In certain embodiments, $R^1$ and $R^2$ are not simultaneously unsubstituted thienyl.

In certain embodiments, $R^1$ and $R^2$ are each selected from 5- to 10-membered heterocycle (e.g., azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, 1,3-thiazolidinyl, thiomorpholinyl, 1,1-dioxidothiomorpholinyl, thiopyranyl, trithianyl, 1,3-benzodithiolyl, benzopyranyl, benzothiopyranyl, 2,3-dihydrobenzofuranyl, 2,3-dihydrobenzothienyl, 2,3-dihydro-1H-indolyl, 2,3-dihydroisoindol-2-yl, 2,3-dihydroisoindol-3-yl, 1,3-dixo-1H-isoindolyl, 5,6-dihydroimidazo-[1,2-a]pyrazin-7(8H)-yl, 1,2,3,4-tetrahydroisoquinolin-2-yl, or 1,2,3,4-tetrahydroquinolinyl), each optionally substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In certain embodiments, $R^1$ and $R^2$ are each selected from $C_3$-$C_8$-cycloalkyl (e.g, cyclopropyl, cyclobutyl, cyclopentyl, cyclohexyl, cycloheptyl, and cyclooctyl), each optionally substituted with 1 to 3 substituents independently selected from the group consisting of —F, —Cl, —$NO_2$, —CN, —OH, —$NH_2$, $C_1$-$C_6$ alkyl, $C_1$-$C_6$ haloalkyl, $C_1$-$C_6$ alkoxy, —$CO_2R^3$, and —$CON(R^4)_2$, wherein $R^3$ and $R^4$, at each occurrence, are each independently selected from the group consisting of hydrogen and $C_1$-$C_6$ alkyl.

In one preferred embodiment, $R^1$ and $R^2$ are each independently selected from the group consisting of: $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each optionally substituted with 1 to 3 substituents independently selected from the group consisting of —OH and —$CO_2H$; $C_6$-$C_{12}$-aryl (e.g., phenyl, dihydroindenyl, indenyl, naphthyl, dihydronaphthalenyl, or 5,6,7,8-tetrahydronaphthalenyl), each optionally substituted with 1 to 3 substituents independently selected from the group consisting of —OH and —$NH_2$; and 5- or 6-membered monocyclic heteroaryl (e.g., pyridinyl), each optionally substituted with 1 to 3 suitable substituents (e.g., —OH, —$NH_2$, —$CO_2H$, halogen).

In another preferred embodiment, $R^1$ and $R^2$ are each selected from $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each optionally substituted with 1 to 3 substituents independently selected from the group consisting of —OH and —$CO_2H$.

In another preferred embodiment, $R^1$ and $R^2$ are each selected from $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each substituted with 1 to 3 substituents independently selected from the group consisting of —OH and —$CO_2H$.

In another preferred embodiment, $R^1$ and $R^2$ are each selected from $C_1$-$C_{10}$-alkyl (e.g., methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, or decyl), each substituted with 1 substituent independently selected from the group consisting of —OH and —CO$_2$H.

In another preferred embodiment, R$^1$ and R$^2$ are each selected from C$_6$-C$_{12}$-aryl (e.g., phenyl, dihydroindenyl, indenyl, naphthyl, dihydronaphthalenyl, or 5,6,7,8-tetrahydronaphthalenyl), each optionally substituted with 1 to 3 substituents independently selected from the group consisting of —OH and —NH$_2$.

In another preferred embodiment, R$^1$ and R$^2$ are each selected from C$_6$-C$_{12}$-aryl (e.g., phenyl, dihydroindenyl, indenyl, naphthyl, dihydronaphthalenyl, or 5,6,7,8-tetrahydronaphthalenyl), each substituted with 1 to 3 substituents independently selected from the group consisting of —OH and —NH$_2$.

In another preferred embodiment, R$^1$ and R$^2$ are each selected from C$_6$-C$_{12}$-aryl (e.g., phenyl, dihydroindenyl, indenyl, naphthyl, dihydronaphthalenyl, or 5,6,7,8-tetrahydronaphthalenyl), each substituted with 1 substituent independently selected from the group consisting of —OH and —NH$_2$.

In another preferred embodiment, R$^1$ and R$^2$ are each selected from a 5- or 6-membered monocyclic heteroaryl (e.g., pyridinyl), each optionally substituted with 1 to 3 suitable substituents (e.g., —OH, —NH$_2$, —CO$_2$H, halogen).

Specifically preferred compounds of the invention include, but are not limited to, dipropyl disulfide; 2,2'-dithiodiethanol; 2,2'-dithiodiacetic acid; 3,3'-dithiodipropionic acid; 4,4'-dithiodibutyric acid; 3,3'-dihydroxydiphenyl disulfide; 4-aminophenyl disulfide; 2-aminophenyl disulfide; and 2,2'-dithiodipyridine.

In certain embodiments, the following amino disulfides are excluded as compounds of the invention: cystine; cystamine; and disulfides of 1-amino-2-methyl-2-thiopropane, 1-amino-3-thiopropane, 1-amino-4-thiobutane, 2-amino-3-methyl-1-thiobutane, 2-amino-1-thiohexane, 2-amino-3,3-dimethyl-1-thiobutane, 1-amino-2-thiopropane, 2-amino-3-methyl-3-thiobutanecarboxylic acid (penicillamine), 2-amino-3-thiobutanecarboxylic acid (homocysteine), 2-amino-2-methyl-1-thiopropane, 1-amino-2-thiohexane, 2-amino-1-thiohexadecane, 2-amino-3-thioadipic acid, 2-amino-3-thio-3-phenylpropanecarboxylic acid, 1-amino-2-thio-1,2-diphenylethane, and 2-(2-amino-1-thioethyl)-naphthalene; and their respective acid addition salts.

In certain embodiments, the following dialkyl disulfides are excluded as compounds of the invention: diethyl disulfide, di-n-propyl disulfide, diisopropyl disulfide, diallyl disulfide, di-n-butyl disulfide, di-sec-butyl disulfide, diisobutyl disulfide, di-tert-butyl disulfide, di-n-pentyl disulfide, di-neopentyl disulfide, di-n-hexyl disulfide, di-n-heptyl disulfide, di-n-octyl disulfide, di-n-nonyl disulfide, di-n-decyl disulfide, di-n-dodecyl disulfide, di-n-tridecyl disulfide, di-n-tetradecyl disulfide, di-n-pentadecyl disulfide, di-n-hexadecyl disulfide, di-n-heptadecyl disulfide, di-n-octadecyl disulfide, di-n-decyl disulfide; diundecyl disulfide, didodecyl disulfide, and dihexadecyl disulfide.

In certain embodiments, diallyl disulfide is excluded as a compound of the invention.

In certain embodiments, the following diaryl disulfides are excluded as compounds of the invention: dibenzyl disulfide, and 2-naphthyl disulfide.

In certain embodiments, dithienyl disulfide is excluded as a compound of the invention.

The compounds of the invention may contain asymmetric centers and can thus occur as racemates and racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within the scope of this invention. The present invention is meant to comprehend all such isomeric forms of these compounds.

3. COMPOSITIONS

The compositions disclosed herein include at least one compound as described above. The compositions may be a pure composition of a compound of formula (I). Alternatively, the compositions may comprise a mixture of compounds of formula (I).

A composition of the invention may comprise from about 0.01 wt % to about 100 wt % of one or more compounds of the invention, from about 0.1 wt % to about 100 wt % of one or more compounds of the invention, from about 1 wt % to about 10 wt % of one or more compounds of the invention, or from about 2 wt % to about 3 wt % of one or more compounds of the invention, based on total weight of the composition. A composition of the invention may comprise 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, or 5.0 wt % of one or more compounds of the invention, based on total weight of the composition. Each system may have its own requirements, and the weight percent of compounds of the invention in the composition may vary with the system in which it is used.

The compositions of the invention optionally include one or more additives. Suitable additives include, but are not limited to, additional corrosion inhibitors, solvents, asphaltene inhibitors, paraffin inhibitors, scale inhibitors, emulsifiers, water clarifiers, dispersants, emulsion breakers, hydrogen sulfide scavengers, gas hydrate inhibitors, biocides, pH modifiers, and surfactants.

In one preferred embodiment, a composition of the invention comprises at least one compound of formula (I), and at least one solvent. In another preferred embodiment, a composition of the invention comprises at least one compound of formula (I), at least one additional corrosion inhibitor (e.g., a quaternary ammonium salt), and at least one solvent.

a. Additional Corrosion Inhibitors

Suitable additional corrosion inhibitors for inclusion in the compositions include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable alkyl, hydroxyalkyl, alkylaryl arylalkyl or arylamine quaternary salts include those alkylaryl, arylalkyl and arylamine quaternary salts of the formula [N$^+$R$^{5a}$R$^{6a}$R$^{7a}$R$^{8a}$][X$^-$] wherein R$^{5a}$, R$^{6a}$, R$^{7a}$, and R$^{8a}$ contain one to 18 carbon atoms, and X is Cl, Br or I. In certain embodiments, R$^{5a}$, R$^{6a}$, R$^{7a}$, and R$^{8a}$ are each independently selected from the group consisting of alkyl (e.g., C$_1$-C$_{18}$ alkyl), hydroxyalkyl (e.g., C$_1$-C$_{18}$ hydroxyalkyl), and arylalkyl (e.g., benzyl). The mono or polycyclic aromatic amine salt with an alkyl or alkylaryl halide include salts of the formula [N⁺R⁵ᵃR⁶ᵃR⁷ᵃR⁸ᵃ][X⁻] wherein $R^{5a}$, $R^{6a}$, $R^{7a}$, and $R^{8a}$ contain one to 18 carbon atoms, and X is Cl, Br or I.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. Suitable quaternary ammonium compounds (quats) include, but are not limited to, trialkyl, dialkyl, dialkoxy alkyl, monoalkoxy, benzyl, and imidazolinium quaternary ammonium compounds, salts thereof, the like, and combinations thereof. In certain embodiments, the quaternary ammonium salt is an alkylamine benzyl quaternary ammonium salt, a benzyl triethanolamine quaternary ammonium salt, or a benzyl dimethylaminoethanolamine quaternary ammonium salt.

In certain embodiments, the corrosion inhibitor may be a quaternary ammonium or alkyl pyridinium quaternary salt such as those represented by the general formula:

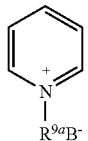

wherein $R^{9a}$ is an alkyl group, an aryl group, or an arylalkyl group, wherein said alkyl groups have from 1 to about 18 carbon atoms and B is Cl, Br or I. Among these compounds are alkyl pyridinium salts and alkyl pyridinium benzyl quats. Exemplary compounds include methylpyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium and an alkyl benzyl pyridinium chloride, preferably wherein the alkyl is a $C_1$-$C_6$ hydrocarbyl group. In certain embodiments, the corrosion inhibitor includes benzyl pyridinium chloride.

In certain embodiments, the corrosion inhibitor may be an imidazoline derived from a diamine, such as ethylene diamine (EDA), diethylene triamine (DETA), triethylene tetraamine (TETA) etc. and a long chain fatty acid such as tall oil fatty acid (TOFA). Suitable imidazolines include those of formula:

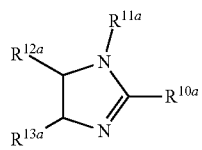

wherein $R^{12a}$ and $R^{13a}$ are independently a $C_1$-$C_6$ alkyl group or hydrogen, $R^{11a}$ is hydrogen, $C_1$-$C_6$ alkyl, $C_1$-$C_6$ hydroxyalkyl, or $C_1$-$C_6$ arylalkyl, and $R^{10a}$ is a $C_1$-$C_{20}$ alkyl or a $C_1$-$C_{20}$ alkoxyalkyl group. In a certain embodiments, $R^{11a}$, $R^{12a}$ and $R^{13a}$ are each hydrogen and $R^{10a}$ is the alkyl mixture typical in tall oil fatty acid (TOFA).

In certain embodiments, the corrosion inhibitor compound may be an imidazolinium compound of the following formula:

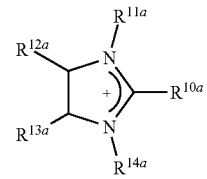

wherein $R^{12a}$ and $R^{13a}$ are independently a $C_1$-$C_6$ alkyl group or hydrogen, $R^{11a}$ and $R^{14a}$ are independently hydrogen, $C_1$-$C_6$ alkyl, $C_1$-$C_6$ hydroxyalkyl, or $C_1$-$C_6$ arylalkyl, and $R^{10}$ is a $C_1$-$C_{20}$ alkyl or a $C_1$-$C_{20}$ alkoxyalkyl group.

Suitable mono-, di- and trialkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethyl phosphate with triethylphosphate producing a more broad distribution of alkyl phosphate esters. Alternatively, the phosphate ester may be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor compound may further be a monomeric or oligomeric fatty acid. Preferred are $C_{14}$-$C_{22}$ saturated and unsaturated fatty acids as well as dimer, trimer and oligomer products obtained by polymerizing one or more of such fatty acids.

A composition of the invention may comprise from 0 to 80 percent, 0 to 60 percent, or 0 to 50 percent by weight of one or more additional corrosion inhibitors, based on total weight of the composition. In certain embodiments, a composition of the invention comprises from 0 to 10 percent by weight of one or more additional corrosion inhibitors, based on total weight of the composition. In certain embodiments, a composition of the invention comprises 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of one or more additional corrosion inhibitors, based on total weight of the composition. Each system may have its own requirements, and the weight percent of one or more additional corrosion inhibitors in the composition may vary with the system in which it is used.

b. Solvents

Suitable solvents include, but are not limited to, alcohols, hydrocarbons, ketones, ethers, aromatics, amides, nitriles, sulfoxides, esters, glycol ethers, aqueous systems, and combinations thereof. In certain embodiments, the solvent is water, isopropanol, methanol, ethanol, 2-ethylhexanol, heavy aromatic naphtha, toluene, ethylene glycol, ethylene glycol monobutyl ether (EGMBE), diethylene glycol monoethyl ether, or xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative non-polar solvents suitable for formulation with the composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like.

In certain embodiments, the solvent is a polyhydroxylated solvent, a polyether, an alcohol, or a combination thereof. In certain embodiments, the solvent is monoethyleneglycol, methanol, dimethyl sulfoxide (DMSO), dimethylformamide (DMF), tetrahydrofuran (THF), or a combination thereof.

A composition of the invention may comprise from 0 to 99 percent or 1 to 98 percent by weight of one or more solvents, based on total weight of the composition. In certain embodiments, a composition of the invention comprises 20%, 25%, 30%, 35%, 40%, 45%, 50%, 55%, 60%, 65%, 70%, 75%, 80%, 85%, 90%, or 95% by weight of one or more solvents, based on total weight of the composition. In certain embodiments, a composition of the invention comprises 80%, 81%, 82%, 83%, 84%, 85%, 86%, 87%, 88%, 89%, 90%, 91%, 92%, 93%, 94%, 95%, 96%, 97%, 98%, or 99% by weight of one or more solvents, based on total weight of the composition.

c. Asphaltene Inhibitors

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

d. Paraffin Inhibitors

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylpnenolic resins.

e. Scale Inhibitors

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamido-methyl propane sulfonate terpolymer (PMA/AMPS).

f. Emulsifiers

Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

g. Water Clarifiers

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

h. Dispersants

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

i. Emulsion Breakers

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

j. Hydrogen Sulfide Scavengers

Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, monomethylamine triazine, and triazines from multiple amines or mixtures thereof), and glyoxal.

k. Gas Hydrate Inhibitors

Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, monopropylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate). Suitable kinetic hydrate inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

l. Biocides

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

m. pH Modifiers

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

n. Surfactants

Suitable surfactants include, but are not limited to, anionic surfactants, cationic surfactants, zwitterionic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropripionates and amphodipropionates, and alkyliminodipropionate.

In certain embodiments, the surfactant may be a quaternary ammonium compound, an amine oxide, an ionic or non-ionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl) dimethyl quaternary ammonium methyl sulfate.

o. Additional Components

Corrosion inhibitor compositions made according to the invention may further include additional functional agents or additives that provide a beneficial property. For example, additional agents or additives may be selected from the group consisting of pH adjusters or other neutralizing agents, surfactants, emulsifiers, sequestrants, solubilizers, other lubricants, buffers, detergents, cleaning agent, rinse aid composition, secondary anti-corrosion agent, preservatives, binders, thickeners or other viscosity modifiers, processing aids, carriers, water-conditioning agents, foam inhibitors or foam generators, threshold agent or system, aesthetic enhancing agent (i.e., dye, odorant, perfume), other agents or additives suitable for formulation with a corrosion inhibitor composition and the like, and mixtures thereof. Additional agents or additives will vary according to the particular corrosion inhibitor composition being manufactured and its intend use.

Compositions made according to the invention may further include additional functional agents or additives that provide a beneficial property. Additional agents or additives will vary according to the particular composition being manufactured and its intended use as one skilled in the art will appreciate. According to one embodiment, the compositions do not contain any of the additional agents or additives.

4. METHODS OF USE FOR THE OIL/GAS INDUSTRY

The compositions of the invention may be used for inhibiting corrosion in oil and gas applications. The compositions may be used for inhibiting corrosion by treating a gas or liquid stream with an effective amount of a compound or composition of the invention, as described herein. The compositions of the invention can be used in any industry where it is desirable to inhibit corrosion at a surface.

In certain embodiments, the compositions can be used in water systems, condensate/oil systems/gas systems, or any combination thereof. In certain embodiments, the compositions can be applied to a gas or liquid produced or used in the production, transportation, storage, and/or separation of crude oil or natural gas. In certain embodiments, the compositions can be applied to a gas stream used or produced in a coal-fired process, such as a coal-fired power plant. In certain embodiments, the compositions can be applied to a gas or liquid produced or used in a waste-water process, a farm, a slaughter house, a land-fill, a municipality waste-water plant, a coking coal process, or a biofuel process.

A fluid to which the compositions may be introduced may be an aqueous medium. The aqueous medium may comprise water, gas, and optionally liquid hydrocarbon. A fluid to which the compositions may be introduced may be a liquid hydrocarbon. The liquid hydrocarbon may be any type of liquid hydrocarbon including, but not limited to, crude oil, heavy oil, processed residual oil, bitminous oil, coker oils, coker gas oils, fluid catalytic cracker feeds, gas oil, naphtha, fluid catalytic cracking slurry, diesel fuel, fuel oil, jet fuel, gasoline, and kerosene. In certain embodiments, the fluid or gas may be a refined hydrocarbon product.

A fluid or gas treated with a composition of the invention may be at any selected temperature, such as ambient temperature or an elevated temperature. In certain embodiments, the fluid (e.g., liquid hydrocarbon) or gas may be at a temperature of from about 40° C. to about 250° C. In certain embodiments, the fluid or gas may be at a temperature of from −50° C. to 300° C., 0° C. to 200° C., 10° C. to 100° C., or 20° C. to 90° C. In certain embodiments, the fluid or gas may be at a temperature of 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., or 40° C. In certain embodiments, the fluid or gas may be at a temperature of 85° C., 86° C., 87° C., 88° C., 89° C., 90° C., 91° C., 92° C., 93° C., 94° C., 95° C., 96° C., 97° C., 98° C., 99° C., or 100° C.

The compositions of the invention may be added to a fluid at various levels of water cut. For example, the water cut may be from 0% to 100% volume/volume (v/v), from 1% to 80% v/v, or from 1% to 60% v/v. The fluid can be an aqueous medium that contains various levels of salinity. In one embodiment, the fluid may have a salinity of 0% to 25%, about 1% to 24%, or about 10% to 25% weight/weight (w/w) total dissolved solids (TDS).

The fluid or gas in which the compositions of the invention are introduced may be contained in and/or exposed to many different types of apparatuses. For example, the fluid or gas may be contained in an apparatus that transports fluid or gas from one point to another, such as an oil and/or gas pipeline. In certain embodiments, the apparatus may be part of an oil and/or gas refinery, such as a pipeline, a separation vessel, a dehydration unit, or a gas line. The fluid may be contained in and/or exposed to an apparatus used in oil extraction and/or production, such as a wellhead. The apparatus may be part of a coal-fired power plant. The apparatus may be a scrubber (e.g., a wet flue gas desulfurizer, a spray dry absorber, a dry sorbent injector, a spray tower, a contact or bubble tower, or the like). The apparatus may be a cargo vessel, a storage vessel, a holding tank, or a pipeline connecting the tanks, vessels, or processing units. In certain embodiments, the fluid or gas may be contained in water systems, condensate/oil systems/gas systems, or any combination thereof.

The compositions of the invention may be introduced into a fluid or gas by any appropriate method for ensuring dispersal through the fluid or gas. In certain embodiments, the inhibitor composition is added at a point in a flow line upstream from the point at which corrosion prevention is desired. The compositions may be injected using mechanical equipment such as chemical injection pumps, piping tees, injection fittings, atomizers, quills, and the like. The compositions of the invention may be introduced with or without one or more additional polar or non-polar solvents depending upon the application and requirements. In certain embodiments, the compositions of the invention may be pumped into an oil and/or gas pipeline using an umbilical line. In certain embodiments, capillary injection systems can be used to deliver the compositions to a selected fluid. In certain embodiments, the compositions can be introduced into a liquid and mixed. In certain embodiments, the compositions can be injected into a gas stream as an aqueous or nonaqueous solution, mixture, or slurry. In certain embodiments, the fluid or gas may be passed through an absorption tower comprising a compound or composition of the invention.

The compositions may be applied to a fluid or gas to provide any selected concentration. In practice, the compositions of the invention are typically added to a flow line to provide an effective treating dose of the described compounds or compositions from about 0.01 to about 5,000 ppm. In certain embodiments, the compositions may be applied to a fluid or gas to provide an actives concentration of about 1 parts per million (ppm) to about 1,000,000 ppm, about 1 parts per million (ppm) to about 100,000 ppm, or about 10 ppm to about 75,000 ppm. The compositions may be applied to a fluid to provide an actives concentration of about 100 ppm to about 10,000 ppm, about 200 ppm to about 8,000 ppm, or about 500 ppm to about 6,000 ppm. In certain embodiments, the compositions are applied to a fluid or gas to provide an actives concentration of 0.1 ppm, 0.5 ppm, 1 ppm, 2 ppm, 5 ppm, 10 ppm, 20 ppm, 100 ppm, 200 ppm, 500 ppm, or 1,000 ppm. In certain embodiments, the compositions are applied to a fluid or gas to provide an actives concentration of 0.125 ppm, 0.25 ppm, 0.625 ppm, 1 ppm, 1.25 ppm, 2.5 ppm, 5 ppm, 10 ppm, or 20 ppm. Each system may have its own dose level requirements, and the effective dose level of a composition to sufficiently reduce the rate of corrosion may vary with the system in which it is used.

The compositions may be applied continuously, in batch, or a combination thereof. In certain embodiments, the composition doses may be continuous to prevent corrosion. In certain embodiments, the composition doses may be intermittent (i.e., batch treatment). In a further embodiment, the composition doses may be continuous/maintained and/or intermittent to inhibit corrosion. Dosage rates for continuous treatments typically range from about 10 to about 500 ppm, or about 10 to about 200 ppm. Dosage rates for batch treatments typically range from about 10 to about 400,000 ppm, or about 10 to about 20,000 ppm. In certain embodiments, the composition may be applied as a pill to a pipeline, providing a high dose (e.g., 20,000 ppm) of the composition.

The flow rate of a flow line in which the composition is used may be between 0 and 100 feet per second, or between 0.1 and 50 feet per second. In some cases, the compositions may be formulated with water in order to facilitate addition to the flow line.

The compositions may provide at least 80, 81, 82, 83, 84, 85, 86, 87, 88, 89, 90, 91, 92, 93, 94, 95, 96, 97, 98, or 99% corrosion protection for a solid, optionally as defined by a 1018 carbon steel coupon in a wheel box test. A wheel box test may be performed according to NACE publication ID182 (December 1982). The wheel box is a test that is often used to compare the performance of one corrosion inhibitor to another. In certain embodiments, a composition of the invention provides at least 80%, at least 85%, or at least 90% corrosion protection for a 1018 carbon steel coupon in a wheel box test, wherein the wheel box test is characterized by a testing temperature of about 176° F.; a $CO_2$ saturated liquid medium of 10% LVT-200 oil and 90% ASTM Seawater brine; a test duration of 24 hours; and an inhibitor dosage of 20 ppm based on total fluids. In certain embodiments, a composition of the invention provides 80%, 81%, 82%, 83%, 84%, 85%, 86%, 87%, 88%, 89%, 90%, 91%, 92%, 93%, 94%, 95%, 96%, 97%, 98%, or 99% corrosion protection for a 1018 carbon steel coupon in a wheel box test, wherein the wheel box test is characterized by a testing temperature of about 176° F.; a $CO_2$ saturated liquid medium of 10% LVT-200 oil and 90% ASTM Seawater brine; a test duration of 24 hours; and an inhibitor dosage of 20 ppm based on total fluids.

The compositions may evolve 250 ppm or less, 200 ppm or less, 150 ppm or less, 100 ppm or less, 50 ppm or less, 30 ppm or less, 25 ppm or less, 20 ppm or less, 15 ppm or less, 10 ppm or less, 9 ppm or less, 8 ppm or less, 7 ppm or less, 6 ppm or less, 5 ppm or less, 4 ppm or less, 3 ppm or less, 2 ppm or less, 1 ppm or less, or 0 ppm of sulfur species into a headspace. The headspace sulfur species concentration can be determined by placing a sample of the composition (e.g., 40 g) into a sealed receptacle (e.g., an 8 oz glass jar sealed with a cap containing a hole fitted with a rubber stopper which is used for sampling); aging the composition at a selected temperature for a selected time period (e.g., in a 50° C. oven over a period of 10 days); and sampling the headspace for sulfur species (e.g., with detection tubes, such as GasTec sulfur detection tubes). The sulfur species quantified may include hydrogen sulfide, mercaptans (e.g., methyl mercaptan, ethyl mercaptan, and the like), sulfur dioxide, and/or carbonyl sulfide.

5. OTHER METHODS OF USE

The compositions of the invention may be used for inhibiting corrosion in other applications.

The compositions are useful for corrosion inhibition of containers, processing facilities, or equipment in the food service or food processing industries. The compositions have particular value for use on food packaging materials and equipment, and especially for cold or hot aseptic packaging. Examples of process facilities in which the compositions can be employed include a milk line dairy, a continuous brewing system, food processing lines such as pumpable food systems and beverage lines, ware wash machines, low temperature ware wash machines, dishware, bottle washers, bottle chillers, warmers, third sink washers, processing equipment such as tanks, vats, lines, pumps and hoses (e.g., dairy processing equipment for processing milk, cheese, ice cream and other dairy products), and transportation vehicles. The compositions can be used to inhibit corrosion in tanks, lines, pumps, and other equipment used for the manufacture and storage of soft drink materials, and also used in the bottling or containers for the beverages.

The compositions can also be used on or in other industrial equipment and in other industrial process streams such as heaters, cooling towers, boilers, retort waters, rinse waters, aseptic packaging wash waters, and the like. The compositions can be used to treat surfaces in recreational waters such as in pools, spas, recreational flumes and water slides, fountains, and the like.

The compositions can be used to inhibit the corrosion of metal surfaces contacted with cleaners in surfaces found in janitorial and/or housekeeping applications, food processing equipment and/or plant applications, and in laundry applications. For example, the corrosion of washers, such as tunnel washers for washing textiles, may be inhibited according to methods disclosed herein.

The compositions can be used or applied in combination with low temperature dish and/or warewash sanitizing final rinse, toilet bowl cleaners, and laundry bleaches. The compositions and methods can be used to treat metal surfaces, such as ware, cleaned and/or sanitized with corrosive sources.

a. Hypochlorite Solutions

The compositions and methods disclosed herein protect surfaces from corrosion caused by hypochlorite bleach. A method may include providing the corrosion inhibitor composition to a surface treated with a hypochlorite solution in order to inhibit corrosion caused by the hypochlorite solution. The method may include preparing an aqueous use composition of the present corrosion inhibitor composition. The method may further include contacting a surface, such as a hard metal surface, in need of corrosion inhibition due to contact with a hypochlorite solution.

b. Dispensing the Compositions

The corrosion inhibitor compositions may be dispensed in any suitable method generally known by one skilled in the art. For example, a spray-type dispenser may be used, such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. A spray-type dispenser functions by impinging a water spray upon an exposed surface of a composition to dissolve a portion of the composition, and then immediately directing the concentrate solution including the composition out of the dispenser to a storage reservoir or directly to a point of use.

The compositions may be dispensed by immersing either intermittently or continuously in water. The composition can then dissolve, for example, at a controlled or predetermined rate. The rate can be effective to maintain a concentration of dissolved agent that is effective for use according to the methods disclosed herein.

6. EXAMPLES

The foregoing may be better understood by reference to the following examples, which are presented for purposes of illustration and are not intended to limit the scope of the invention.

Table 1 provides exemplary disulfide compounds that can be used as corrosion inhibitors. The disulfide compounds of Table 1 are commercially available.

TABLE 1

Organic Disulfide Corrosion Inhibitor Compounds

| Example | Disulfide Compound |
| --- | --- |
| Ex. 1 | dipropyl disulfide |
| Ex. 2 | 2,2'-dithiodiethanol |
| Ex. 3 | 2,2'-dithiodiacetic acid |
| Ex. 4 | 3,3'-Dithiodipropionic acid |
| Ex. 5 | 4,4'-dithiodibutyric acid |
| Ex. 6 | 3,3'-dihydroxydiphenyl disulfide |
| Ex. 7 | 4-aminophenyl disulfide |
| Ex. 8 | 2-aminophenyl disulfide |
| Ex. 9 | 2,2'-dithiodipyridine |

Corrosion Performance

To illustrate the corrosion inhibiting ability of compounds and compositions of the invention, corrosion inhibitor solutions were prepared by dissolving the organic disulfide of interest to 2.5 wt % in a suitable solvent. Since it is known that thiol-containing compounds readily improve the corrosion inhibiting properties of other traditional corrosion inhibitor molecules, a second set of formulations were prepared to illustrate this effect. To this end, additional formulations were prepared by dissolving a 2.5 wt % solution of organic disulfides with 7.5 wt % solutions of quaternary amine based corrosion inhibitors in a suitable solvent. The performance of these two sets of corrosion inhibitor formulations were subsequently tested for performance using a wheel box test method, the results of which are shown below in Tables 1 and 2, respectively.

Wheel box tests are typically used as a screening method for assessing the corrosion inhibiting ability of additives to a corrosive solution. Compounds of the invention were tested for the ability to act as corrosion inhibitors alone and in combination with other known corrosion inhibitor actives, specifically quaternary ammonium salt compounds.

The following sets of conditions were used to compare the corrosion inhibiting ability of a variety of organic disulfides in wheelbox testing:

Temperature: 80° C. (176° F.)
Oil: LVT-200 (kerosene)
Brine: Synthetic seawater brine
Water cut: 90%
$pCO_2$: atmospheric pressure
Duration: 24 hours
Metal Coupon: C1018 Mild Steel Pre-weighed and measured metal coupons are added to the test fluids in a sealed vessel which is constantly rotated under the conditions described above. Corrosion rates are calculated by measuring the amount of metal loss (weight) throughout the duration of the test and by the surface area of metal available. Corrosion rates are compared between uninhibited and inhibited solutions in order to calculate a % protection of specific formulations.

Corrosion inhibitor performance was compared to that of an untreated blank sample as well as a range of dose rates to show performance with respect to concentration. All data is reported as a corrosion rate in mils per year (mpy). The data shown in Table 2 clearly demonstrates the effectiveness of compounds of the invention towards reducing the corrosion rate of the fluids. A number of organic disulfides were compared to that of organic thiols, namely mercaptoacetic acid and 2-mercaptoethanol, commonly used for corrosion protection of internal oilfield production equipment from both $CO_2$ and $H_2S$ acid corrosion.

As can be noted from the data of Table 2, all of the evaluated organic disulfides performed better than the thiol based compounds at the highest dose rate.

Headspace Analysis

In order to illustrate the added benefit of disulfides of improving the evolution of volatile sulfur containing degradation components, headspace measurements were performed on example corrosion inhibitor formulations. The method used for this screening is to place 40 g of the formulated corrosion inhibitor into an 8 oz glass jar sealed with a cap containing a hole fitted with a rubber stopper which is used for sampling. The samples were subsequently aged in a 50° C. oven over a period of 10 days before sampling.

TABLE 2

Wheel Box Corrosion Performance Data (mpy) of Organic Disulfides

| | Sulfur Compound | Sulfur Compound Concentration (ppm) | | | | | | % Protection @ 20 ppm vs. BLANK |
|---|---|---|---|---|---|---|---|---|
| | | 0.25 | 1 | 2.5 | 5 | 10 | 20 | |
| Comparative | mercaptoacetic acid | 31.29 | 20.44 | 19.58 | 17.78 | 18.27 | 18.03 | 73.4% |
| Comparative | 2-mercaptoethanol | 35.56 | 13.73 | 13.15 | 13.69 | 14.61 | 14.46 | 78.6% |
| Ex. 1 | dipropyl disulfide | 44.68 | 49.62 | 18.61 | 17.93 | 10.34 | 8.48 | 87.5% |
| Ex. 2 | 2,2'-dithiodiethanol | 19.18 | 17.02 | 13.97 | 14.91 | 15.31 | 5.70 | 91.6% |
| Ex. 4 | 3,3'-Dithiodipropionic acid | 24.03 | 12.23 | 12.54 | 12.44 | 11.38 | 11.47 | 83.0% |
| Ex. 5 | 4,4'-dithiodibutyric acid | 12.84 | 12.20 | 12.93 | 10.52 | 9.06 | 8.97 | 86.7% |
| Ex. 6 | 3,3'-dihydroxydiphenyl disulfide | 15.89 | 15.46 | 15.01 | 14.73 | 12.20 | 7.05 | 89.6% |
| Ex. 7 | 4-aminophenyl disulfide | 27.69 | 13.39 | 10.89 | 5.70 | 5.80 | 5.70 | 91.6% |
| Ex. 8 | 2-aminophenyl disulfide | 12.05 | 11.35 | 11.07 | 10.28 | 10.77 | 8.17 | 87.9% |
| Ex. 9 | 2,2'-dithiodipyridine | 16.29 | 15.59 | 14.55 | 10.13 | 9.85 | 5.46 | 91.9% |
| | Blank | 67.65 | | | | | | |

A second set of tests were performed under identical conditions as those described above. In a non-limiting example, an organic disulfide type compound is used in combination with an organic quaternary ammonium salt in order to illustrate the synergistic properties between organic disulfides and other commonly used organic corrosion inhibitors. The results of this test can be seen in Table 3 below and are represented as a concentration of sulfur compound in order to show a direct comparison to the data of Table 2. By comparing the data of this test to the results of the disulfides alone, it can clearly be seen that the combination of other corrosion inhibitor components and organic disulfides significantly lower the corrosivity of the fluids and offers better corrosion protection to the metal surface.

Samples were analyzed by removal of the rubber stopper and the headspace was subsequently sampled using GasTec sulfur detection tubes.

Two sets of test were performed with samples at the same concentrations as listed above for corrosion performance tests. In one example, organic sulfur compound was dissolved at 2.5% wt. in a 1:1 water:glycol ether solvent package. In a second example, organic sulfur compound (2.5% wt.) and quaternary amine salt corrosion inhibitor (7.5% wt.) were dissolved in a 1:1 water:glycol ether solvent package for headspace experiments.

The results of headspace evaluation experiments are shown below in Table 4. In each example, it can clearly be noted that the use of a disulfide as the corrosion inhibitor component, as opposed to a tradition thiol/mercaptan based corrosion inhibi-

TABLE 3

Wheel Box Corrosion Performance Data (mpy) of Organic Disulfides with Quaternary Amines

| | Sulfur Compound | Sulfur Compound Concentration (ppm) | | | | | % Protection @ 2.5 ppm vs. BLANK |
|---|---|---|---|---|---|---|---|
| | | 0.125 | 0.25 | 0.625 | 1.25 | 2.5 | |
| Comparative | mercaptoacetic acid | 51.42 | 4.67 | 3.97 | 2.71 | 2.65 | 96.2% |
| Comparative | 2-mercaptoethanol | 44.07 | 44.90 | 4.97 | 3.48 | 3.29 | 95.3% |
| Ex. 1 | dipropyl disulfide | 57.40 | 42.06 | 27.08 | 4.36 | 3.23 | 95.4% |
| Ex. 2 | 2,2'-dithiodiethanol | 50.42 | 5.03 | 4.33 | 4.18 | 3.57 | 94.9% |
| Ex. 4 | 3,3'-Dithiodipropionic acid | 45.87 | 46.73 | 4.79 | 4.06 | 3.93 | 94.4% |
| Ex. 5 | 4,4'-dithiodibutyric acid | 38.83 | 39.65 | 12.81 | 4.39 | 4.03 | 94.3% |
| Ex. 6 | 3,3'-dihydroxydiphenyl disulfide | 9.49 | 9.21 | 3.39 | 3.29 | 3.05 | 95.7% |
| Ex. 7 | 4-aminophenyl disulfide | 42.06 | 43.58 | 20.37 | 12.54 | 4.24 | 94.0% |
| Ex. 8 | 2-aminophenyl disulfide | 31.84 | 10.58 | 3.32 | 3.11 | 3.32 | 95.3% |
| Ex. 9 | 2,2'-dithiodipyridine | 13.51 | 4.73 | 4.18 | 3.57 | 2.90 | 95.9% |
| | Blank | 70.25 | | | | | | tor, that the levels measured in the headspace are either less than that of the thiols tested or no quantifiable amount could be measured by this technique.

TABLE 4

Headspace Results

| | | Headspace Evaluation (ppm) | |
|---|---|---|---|
| | Sulfur Compound | Sulfur Compound Alone | Quaternary Ammonium Salt/Sulfur Compound |
| Comparative | mercaptoacetic acid | 50 | 140 |
| Comparative | 2-mercaptoethanol | 200 | 30 |
| Ex. 2 | 2,2'-dithiodiethanol | 0 | 0 |
| Ex. 3 | 2,2'-dithiodiacetic acid | 30 | 0 |
| Ex. 4 | 3,3'-Dithiodipropionic acid | 0 | 0 |
| Ex. 5 | 4,4'-dithiodibutyric acid | 0 | 0 |
| Ex. 7 | 4-aminophenyl disulfide | 0 | 0 |
| Ex. 8 | 2-aminophenyl disulfide | 0 | 0 |
| Ex. 9 | 2,2'-dithiodipyridine | 0 | 0 |

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

What is claimed is:

1. A method of inhibiting corrosion at a surface, the method comprising contacting the surface with a composition comprising a compound of formula (I),

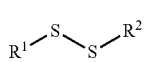

wherein,
R$^1$ and R$^2$ are each independently selected from the group consisting of alkyl, alkenyl, alkynyl, aryl, heteroaryl, heterocycle, and cycloalkyl, wherein said alkyl, alkenyl, alkynyl, aryl, heteroaryl, heterocycle, and cycloalkyl are each independently substituted or unsubstituted with one or more suitable substituents,
wherein the suitable substituent is selected from halo, perfluoroalkyl, perfluoroalkoxy, alkyl, alkenyl, alkynyl, hydroxy, oxo, mercapto, alkylthio, alkoxy, aryl, heteroaryl, aryloxy, heteroaryloxy, aralkyl, heteroaralkyl, aralkoxy, heteroaralkoxy, HO—(C=O)—, cycloalkyl, amino, alkylamino, dialkylamino, carbamoyl, alkylcarbonyl, alkoxycarbonyl, alkylaminocarbonyl, dialkylamino carbonyl, arylcarbonyl, aryloxycarbonyl, alkylsulfonyl, and arylsulfonyl;

with the proviso that the following compounds and their acid addition salts are excluded: cystine; cystamine; disulfides of 1-amino-2-methyl-2-thiopropane, 1-amino-3-thiopropane, 1-amino-4-thiobutane, 2-amino-3-methyl-1-thiobutane, 2-amino-1-thiohexane, 2-amino-3,3-dimethyl-1-thiobutane, 1-amino-2-thiopropane, 2-amino-3-methyl-3-thiobutanecarboxylic acid (penicillamine), 2-amino-3-thiobutanecarboxylic acid (homocysteine), 2-amino-2-methyl-1-thiopropane, 1-amino-2-thiohexane, 2-amino-1-thiohexadecane, 2-amino-3-thioadipic acid, 2-amino-3-thio-3-phenyl-propanecarboxylic acid, 1-amino-2-thio-1,2-diphenylethane, and 2-(2-amino-1-thioethyl)-naphthalene; diethyl disulfide; di-n-propyl disulfide; diisopropyl disulfide; di-n-butyl disulfide; di-sec-butyl disulfide; diisobutyl disulfide; di-tert-butyl disulfide; di-n-pentyl disulfide; di-neopentyl disulfide; di-n-hexyl disulfide; di-n-heptyl disulfide; di-n-octyl disulfide; di-n-nonyl disulfide; di-n-decyl disulfide; di-n-dodecyl disulfide; di-n-tridecyl disulfide; di-n-tetradecyl disulfide; di-n-pentadecyl disulfide; di-n-hexadecyl disulfide; di-n-heptadecyl disulfide; di-n-octadecyl disulfide; di-n-decyl disulfide; diundecyl disulfide; didodecyl disulfide; dihexadecyl disulfide; diallyl disulfide; dibenzyl disulfide; 2-naphthyl disulfide; and dithienyl disulfide.

2. The method of claim 1, wherein R$^1$ and R$^2$ are each independently selected from the group consisting of $C_1$-$C_{10}$-alkyl, $C_6$-$C_{12}$-aryl, monocyclic or bicyclic heteroaryl, and $C_3$-$C_8$-cycloalkyl, wherein said alkyl, aryl, heteroaryl, and cycloalkyl are each independently unsubstituted or substituted with 1 to 3 substituents independently selected from the group consisting of —F, —Cl, —NO$_2$, —CN, —OH, —NH$_2$, $C_1$-$C_6$ haloalkyl, $C_1$-$C_6$ alkoxy, —CO$_2$R$^3$, and —CON(R$^4$)$_2$, wherein R$^3$ and R$^4$, at each occurrence, are each independently selected from the group consisting of hydrogen and $C_1$-$C_6$ alkyl.

3. The method of claim 2, wherein the composition further comprises one or more additional components, each component independently selected from the group consisting of additional corrosion inhibitors, solvents, asphaltene inhibitors, paraffin inhibitors, scale inhibitors, emulsifiers, water clarifiers, dispersants, emulsion breakers, gas hydrate inhibitors, biocides, pH modifiers, and surfactants.

4. The method of claim 2, wherein the composition provides at least 80% corrosion protection for a 1018 carbon steel coupon in a wheel box test, wherein the wheel box test is characterized by:
(a) a testing temperature of about 176° F.;
(b) a CO$_2$ saturated liquid medium of 10% LVT-200 oil and 90% ASTM Seawater brine;
(c) a test duration of 24 hours; and
(d) an inhibitor dosage of 20 ppm based on total fluids.

5. The method of claim 2, wherein the composition provides at least 94% corrosion protection for a 1018 carbon steel coupon in a wheel box test, wherein the wheel box test is characterized by:
(a) a testing temperature of about 176° F.;
(b) a CO$_2$ saturated liquid medium of 10% LVT-200 oil and 90% ASTM Seawater brine;
(c) a test duration of 24 hours; and
(d) an inhibitor dosage of 2.5 ppm based on total fluids.

6. The method of claim 2, wherein the surface is part of equipment used in the production, transportation, storage, and/or separation of crude oil or natural gas.

7. The method of claim 2, wherein the surface is part of equipment used in a coal-fired process, a waste-water process, a farm, a slaughter house, a land-fill, a municipality waste-water plant, a coking coal process, or a biofuel process.

8. The method of claim 1, wherein the composition provides 200 ppm or less of sulfur species in a headspace test, wherein the headspace test is characterized by:
  (a) placing a sample of the composition into a sealed receptacle;
  (b) aging the composition of (a) at a selected temperature for a selected time period; and
  (c) sampling the headspace for sulfur species.

9. The method of claim 8, wherein the composition comprises about 2.5% wt. of one or more compounds of formula (I) in a 1:1 water:glycol ether solvent system.

10. The method of claim 8, wherein the composition comprises about 2.5% wt. of one or more compounds of formula (I) and about 7.5% wt. of a quaternary amine salt corrosion inhibitor in a 1:1 water:glycol ether solvent system.

11. The method of claim 1, wherein $R^1$ and $R^2$ are each selected from $C_1$-$C_{10}$-alkyl, each optionally substituted with 1 to 3 substituents independently selected from the group consisting of —OH and —$CO_2$H.

12. The method of claim 1, wherein $R^1$ and $R^2$ are each selected from $C_1$-$C_{10}$-alkyl, each substituted with 1 to 3 substituents independently selected from the group consisting of —OH and —$CO_2$H.

13. The method of claim 1, wherein $R^1$ and $R^2$ are each selected from linear $C_1$-$C_{10}$-alkyl, each substituted with a terminal —OH group.

14. The method of claim 1, wherein $R^1$ and $R^2$ are each selected from linear $C_1$-$C_{10}$-alkyl, each substituted with a terminal —$CO_2$H group.

15. The method of claim 1, wherein $R^1$ and $R^2$ are each selected from $C_6$-$C_{12}$-aryl, each optionally substituted with 1 to 3 substituents independently selected from the group consisting of —OH and —$NH_2$.

16. The method of claim 1, wherein $R^1$ and $R^2$ are each selected from phenyl, each optionally substituted with 1 to 3 substituents independently selected from the group consisting of —OH and —$NH_2$.

17. The method of claim 1, wherein $R^1$ and $R^2$ are each selected from phenyl, each substituted with an —$NH_2$ group.

18. The method of claim 1, wherein $R^1$ and $R^2$ are each selected from phenyl, each substituted with an —OH group.

19. The method of claim 1, wherein $R^1$ and $R^2$ are each selected from a 5- or 6-membered monocyclic heteroaryl, each optionally substituted with 1 to 3 suitable substituents.

20. The method of claim 1, wherein the composition comprises one or more compounds of formula (I), each independently selected from the group consisting of: 2,2'-dithiodiethanol; 2,2'-dithiodiacetic acid; 3,3'-dithiodipropionic acid; 4,4'-dithiodibutyric acid; 3,3'-dihydroxydiphenyl disulfide; 4-aminophenyl disulfide; 2-aminophenyl disulfide; and 2,2'-dithiodipyridine.

* * * * *